United States Patent
Kim et al.

(10) Patent No.: US 8,023,442 B2
(45) Date of Patent: Sep. 20, 2011

(54) DISCONTINUOUS RECEPTION METHOD AND APPARATUS OF USER EQUIPMENT IN A MOBILE COMMUNICATION SYSTEM

(75) Inventors: Soeng-Hun Kim, Suwon-si (KR); Kyeong-In Jeong, Hwaseong-si (KR); Gert Jan Van Lieshout, Middlesex (GB); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 787 days.

(21) Appl. No.: 12/055,802

(22) Filed: Mar. 26, 2008

(65) Prior Publication Data

US 2008/0248840 A1    Oct. 9, 2008

(30) Foreign Application Priority Data

Mar. 26, 2007  (KR) .................. 10-2007-0029447
Jul. 23, 2007   (KR) .................. 10-2007-0073705

(51) Int. Cl.
*G08C 17/00*    (2006.01)
(52) U.S. Cl. ........................................ 370/311
(58) Field of Classification Search .................. None
See application file for complete search history.

(56) References Cited

U.S. PATENT DOCUMENTS

| | | | | |
|---|---|---|---|---|
| 7,680,071 B2 * | 3/2010 | Bultan et al. | .................. | 370/311 |
| 7,688,771 B2 * | 3/2010 | Lee et al. | ..................... | 370/312 |
| 2007/0109987 A1 * | 5/2007 | Kohlmann et al. | ........... | 370/318 |
| 2007/0178875 A1 * | 8/2007 | Rao et al. | ................... | 455/343.1 |
| 2007/0286080 A1 * | 12/2007 | Kim et al. | ..................... | 370/236 |
| 2007/0291673 A1 * | 12/2007 | Demirhan et al. | ............ | 370/311 |
| 2008/0101268 A1 * | 5/2008 | Sammour et al. | ............ | 370/311 |
| 2008/0182596 A1 * | 7/2008 | Wang et al. | .................... | 455/458 |
| 2008/0186893 A1 * | 8/2008 | Kolding et al. | ............... | 370/311 |
| 2009/0122736 A1 * | 5/2009 | Damnjanovic et al. | ....... | 370/311 |

FOREIGN PATENT DOCUMENTS

WO    WO 2007/024095    3/2007

OTHER PUBLICATIONS

Suckchel Yang et al., Adaptive Discontinuous Reception Mechanism for Power Saving in UMTS, IEEE Communications Letters, vol. 11, No. 1, Jan. 2007.
Shun-Ren Yang et al., Modeling UMTS Discontinuous Reception Mechanism, IEEE Transactions on Wireless Communications, vol. 4, No. 1, Jan. 2005.

* cited by examiner

*Primary Examiner* — Anh-Vu Ly
(74) *Attorney, Agent, or Firm* — The Farrell Law Firm, P.C.

(57) ABSTRACT

A method and apparatus for DRX of a UE in a mobile communication system are provided, in which the UE receives setting information from a network, the setting information including a first DRX cycle length and a second DRX cycle length for a predetermined data service. Upon generation of uplink data, the UE transitions to a downloading phase in which active periods are set according to the first DRX cycle length.

6 Claims, 8 Drawing Sheets

DISCONTINUOUS RECEPTION METHOD AND APPARATUS OF USER EQUIPMENT IN A MOBILE COMMUNICATION SYSTEM

PRIORITY

This application claims priority under 35 U.S.C. §119(a) from Korean Patent Applications filed in the Korean Intellectual Property Office on Mar. 26, 2007 and Jul. 23, 2007, and assigned Serial Nos. 2007-29447 and 2007-73705, respectively, the entire disclosures of both of which are hereby incorporated by reference.

BACKGROUND OF THE INVENTION

1. Field of the Invention

The present invention relates generally to a method and apparatus for receiving data in a User Equipment (UE) in a mobile communication system and more particularly, to a Discontinuous Reception (DRX) method and apparatus of a UE in a mobile communication system.

2. Description of the Related Art

DRX is a type of packet reception scheme used at a UE in a mobile communication system. In DRX, the UE keeps a receiver on only during a data reception-expected period and turns off the receiver during a non-data reception-expected period, rather than keep the receiver on all the time.

FIG. 1 illustrates the concept of a conventional DRX operation. However, before describing FIG. 1 in specific detail, for packet reception in a DRX mode, the following terms should be defined.

(1) Active Period: The receiver of the UE is in an "on state". If DRX is set on a service basis, the receiver expects data reception for a service during an active period of the service.

(2) Sleep Period: The receiver is in an "off state". If DRX is set on a service basis, the receiver does not expect data reception for a service during a sleep period of the service. The sleep period is defined to save power for the UE. Because the UE does not expect to receive any data during the sleep period, it turns off its receiver, thus minimizing power consumption.

(3) DRX cycle lengths 110 and 120: The interval between one active period and the next active period with regard to data of a service.

A decision to turn off the receiver of the UE is made according to whether the sleep periods of a plurality of services provided to the UE are overlapped. For example, if service A and service B are provided to the UE and a current period is a sleep period for service A and an active period for service B, the UE should keep its receiver on. If the sleep periods of service A and service B coincide with each other, the receiver of the UE is turned off. For ease of description, the following description is made on the assumption that the UE receives one service, i.e., its receiver is on during an active period and off during a sleep period.

Referring to FIG. 1, the start position 130 or end position of an active period is determined according to the reception time or received amount of data. In general, the start position 130 of the active period is determined using a UE Identifier (ID) and a DRX cycle length.

In a conventional packet communication system, however, the DRX cycle length is always constant, as illustrated in FIG. 1. As a result, when the UE receives discontinuous data such as Web browsing service data or File Transfer Protocol (FTP) service data in this DRX mode, it consumes unnecessary power due to the nature of the discontinuous data. With reference to FIG. 2, a detailed description will be made of the problem with reception of discontinuous data in the DRX mode. For simplicity, Web browsing service data (Web data, for short) is used as discontinuous data, by way of example.

FIG. 2 illustrates a typical traffic pattern of Web data. Referring to FIG. 2, when a user transmits a message requesting a Web page, for example, a HyperText Transfer Protocol (HTTP) request to a network through his UE in step 215, it receives Web data corresponding to the request message. Reference numeral 205 denotes packets downloaded to the UE from the network (i.e., downlink packet data). A time period for which the UE expects to download the downlink packet data is referred to as a downloading phase 225. When the UE transmits a Transmission Control Protocol Acknowledgment (TCP ACK) 210 for the last downlink packet data to the network in the downloading phase 225, the downloading phase 225 is over as all of the Web data has been downloaded. Then the user starts to read the downloaded Web data through the UE. This is called a reading phase 230. In the reading phase 230, no data is transmitted and received. Notably, the downloading phase 225 and the reading phase 230 are distinguished conceptually for illustrative purposes, though not physically. In real implementation, an active period and a sleep period are physically distinguishable from each other.

If the user later requests new Web data to the network, that is, if the UE transmits a new HTTP request message in step 215, downloading of the new Web data starts in step 220.

As described above, when the user receives the Web browsing service from the network, data transmission and reception frequently take place between the UE and the network in the downloading phase 225, whereas data transmission and reception seldom occurs in the reading phase 230. However, when Web data having this feature is received in the conventional DRX scheme, active periods are disposed at the same cycle in both the downloading phase 225 and the reading phase 230. That is, the conventional DRX is characterized by applying the same DRX cycle length to the downloading phase 225 and the reading phase 230. Accordingly, despite no need for data reception in the reading phase 230, the UE keeps its receiver in an on state, thereby consuming unnecessary power.

SUMMARY OF THE INVENTION

The present invention has been designed to address at least the problems and/or disadvantages and to provide at least the advantages described below. Accordingly, an aspect of the present invention is to provide a method and apparatus for receiving data in DRX mode during an active period of a variable length according to the characteristics of serviced traffic in a UE in a mobile communication system.

Another aspect of the present invention is to provide a method and apparatus for receiving data in DRX mode by setting a sleep period of a variable length according to the characteristics of serviced traffic in a UE in a mobile communication system.

Another aspect of the present invention is to provide a method and apparatus for setting active periods before and after traffic reception to different lengths in a DRX UE in a mobile communication system.

In accordance with an aspect of the present invention, there is provided a DRX method of a UE in a mobile communication system, in which the UE receives setting information from a network, the setting information including a first DRX cycle length and a second DRX cycle length for a predetermined data service, and transitions to a downloading phase in which active periods are set according to the first DRX cycle length, upon generation of uplink data.

If the UE does not have data during a predetermined number of successive active periods in the downloading phase, the UE transitions to a reading phase in which active periods are set according to the second DRX cycle length.

It is preferred that the first DRX cycle length is less than the second DRX cycle length, the predetermined service is a discontinuous data service, the uplink data is uplink data for the discontinuous data service, and the discontinuous data service is a Web browsing service.

It is also preferred that the downloading phase starts at a start position of an active period in the downloading phase, determined using the first DRX cycle length and an ID of the UE and the reading phase starts at a start position of an active period in the reading phase, determined using the second DRX cycle length and the UE ID.

In accordance with another aspect of exemplary embodiments of the present invention, there is provided a DRX apparatus of a UE in a mobile communication system, in which a transceiver receives setting information from a network, the setting information including a first DRX cycle length and a second DRX cycle length for a predetermined data service, a control channel processor receives the setting information from the transceiver, and a DRX controller receives the setting information from the control channel processor and controls the transceiver to transition to a downloading phase in which active periods are set according to the first DRX cycle length, upon generation of uplink data.

BRIEF DESCRIPTION OF THE DRAWINGS

The above and other objects, features, and advantages of certain exemplary embodiments of the present invention will be more apparent from the following detailed description taken in conjunction with the accompanying drawings, in which.

DETAILED DESCRIPTION OF EXEMPLARY EMBODIMENTS

Figure 1:
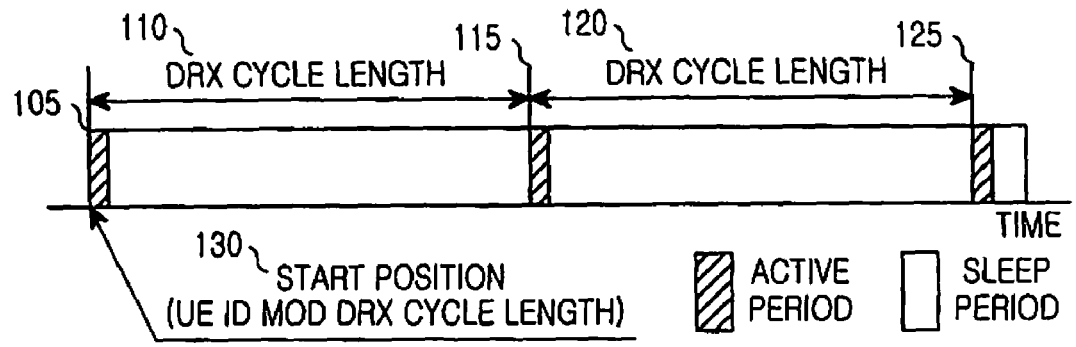
FIG. 1 illustrates the concept of a conventional DRX operation of a UE.
Figure 2:
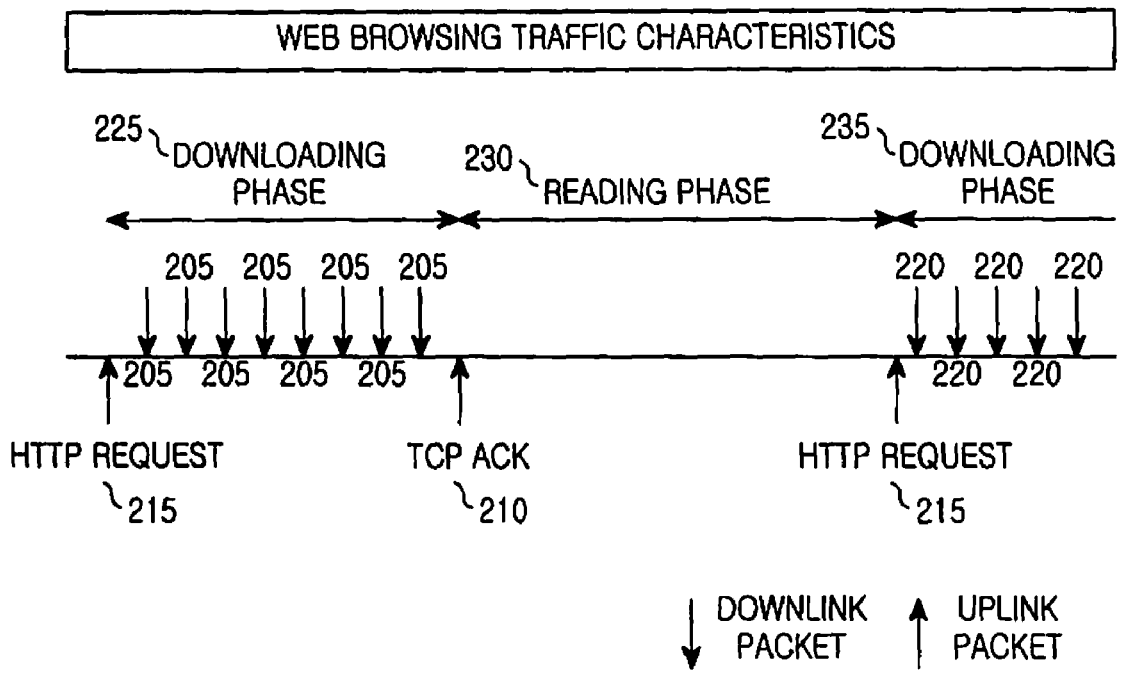
FIG. 2 illustrates a typical traffic pattern of Web data.

The matters defined in the description below, such as a detailed construction and elements, are provided to assist in a comprehensive understanding of the present invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The basic principle of the present invention is that for reception of data associated with a data service, a UE sets dense active periods in a downloading phase and sparse active periods in a reading phase.

Exemplary embodiments of the present invention provide a method for transitioning a UE between a downloading phase and a reading phase in a service. A condition for the transitioning can be generation of uplink data for the service in the UE.

The downloading phase includes a time period for which the UE completely receives a last downlink packet and transmits a TCP ACK for the last downlink packet. Because the UE cannot determine if a received packet is the last one, it considers that the packet is the last packet if no further packet is received for a predetermined time after the packet reception. Then the UE ends the downloading phase and enters into the reading phase. The service can correspond to a specific logical channel. Uplink packet data corresponding to the logical channel is uplink packet data corresponding to the service that the UE requests to a network.

For example, if the UE requests a discontinuous data service (e.g., a Web browsing service) from the network, uplink packet data corresponds to the discontinuous data service. When the present invention is applied to the Web browsing service, an uplink packet for an HTTP request message is uplink packet data corresponding to the logical channel.

To realize the basic principle of the present invention, three exemplary embodiments will be described below in brief.

Embodiment 1 maps a downloading phase to an active period and a reading phase to a sleep period in a one-to-one correspondence.

Embodiment 2 and Embodiment 3 commonly set a short DRX cycle for the downloading phase and a long DRX cycle length for the reading phase. These embodiments differ in that Embodiment 2 is applied to a specific logical channel such as a discontinuous data service channel, whereas Embodiment 3 is applied to a normal channel (i.e., any service channel) and proposes a method for calculating the start positions of active periods.

Embodiment 1

In accordance with a first exemplary embodiment of the present invention, a downloading phase is mapped to an active period and a reading phase to a sleep period in a one-to-one correspondence. As a UE sets the downloading phase as an active period and the reading phase as a sleep period, it keeps its receiver in an on state in the downloading phase and in an off state in the reading phase.

Figure 3:
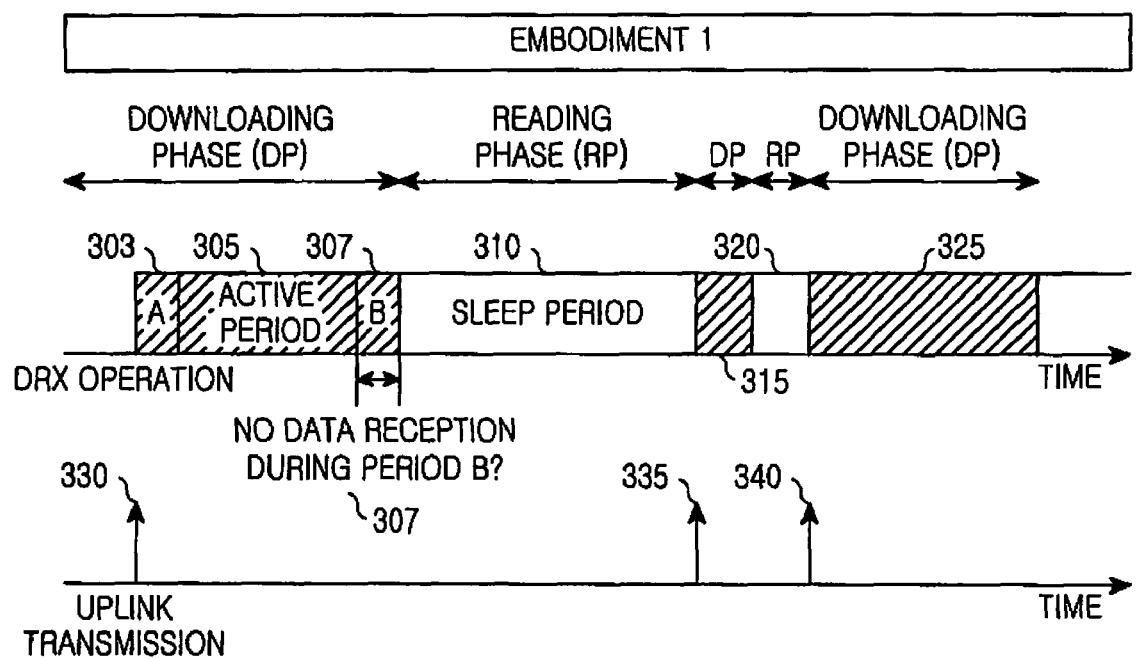
FIG. 3 conceptually illustrates a DRX operation according to a first exemplary embodiment of the present invention.

FIG. 3 conceptually illustrates a DRX operation according to the first exemplary embodiment of the present invention.

During a call setup for a discontinuous data service with a network, a UE receives predetermined "setting information" from the network. The setting information may include "minimum active period value A" and "sleep period timer value B", for use in setting an active period and a sleep period by the UE.

When the call setup is completed, the UE enters into a sleep period and starts a DRX operation. During the sleep period, the UE operates as illustrated in FIG. 3, after generating uplink packet data.

When the UE needs to transmit first uplink packet data to the network, it transitions to an active period. Because the uplink packet data transmitted from the UE after the call setup for the discontinuous data service is mostly a request for the discontinuous data service, it is highly probable that the UE will download downlink packet data of the discontinuous data service from the network, after the uplink packet data transmission. Accordingly, the UE transitions to the active period.

Referring to FIG. 3, the UE completely transmits the first uplink packet to the network, after transitioning to the active period 305 in step 330. The UE can maintain the active period 305 to be as long as or longer than a predetermined minimum value, as indicated by reference numeral 303, in order to receive downlink packet data from the network. The minimum value can be determined according to the minimum active period value A received during the call setup. Obviously, A is variable depending on a system. That is, the active period length is set flexibly by adjusting A to a predetermined value equal to or larger than 0, to thereby control the power consumption of the UE.

Downlink packet data may not be generated after the UE transmits the uplink packet data, and some time is taken for the UE to receive the downlink packet data even though the downlink packet data is generated. Therefore, the UE awaits reception of the downlink packet data during the minimum time period. For this reason, the minimum active period value A is set.

If the UE is downloading downlink packet data during an active period including the minimum active period, it extends the active period.

If the UE downloads no further downlink packet data after a certain time instant, it should determine whether to transition to the sleep period because it is probable that there is no more downlink packet to be downloaded. To make the determination, the UE monitors if no downlink packet data has been downloaded for a predetermined time period starting from a time instant when the UE discontinues downloading downlink packet data. To count the time period after which the UE is supposed to transition to the sleep period, the UE uses a sleep period timer value B 307 received during the call setup.

If the UE has no downloaded downlink packet data after transmitting the uplink data due to generation of no downlink data, a sleep period timer can be activated after the minimum active period elapses.

After confirming that no downlink packets have been downloaded from the network during the sleep period timer value 307, the UE transitions to a sleep period 310 and monitors generation of uplink packet data for the discontinuous data service during the sleep period 310. Upon generation of uplink packet data, the UE transmits the uplink packet 335 and enters into an active period 315. The UE keeps the active period 315 as long as it receives downlink packet data. If the UE then receives no downlink packets from the network during the sleep period timer value B, it ends the active period 315 and transitions to a sleep period 320.

During a sleep period, the UE reads the downloaded downlink packet data. Upon generation of uplink packet data in the sleep period, the UE transmits the uplink packet 340 and transitions to an active period 325, and downloads downlink packet data during the active period 325. The reading and downloading operations continue until the call ends.

As described above, the start position of an active period varies depending on whether uplink packet data is generated in the UE, and the start position of a sleep period varies depending on whether downlink packet data to be downloaded exists during the active period. That is, the lengths of the active period and the sleep period may vary according to the transmission time of uplink packet data from the UE and transmission or non-transmission of downlink packet data.

The first exemplary embodiment of the present invention described above offers the benefit of efficient management of power consumption in the UE because the lengths of an active period and a sleep period are flexibly adjusted according to packets transmitted and received between the UE and the network. Herein below, a DRX operation according to the first exemplary embodiment of the present invention will be described.

Figure 4:
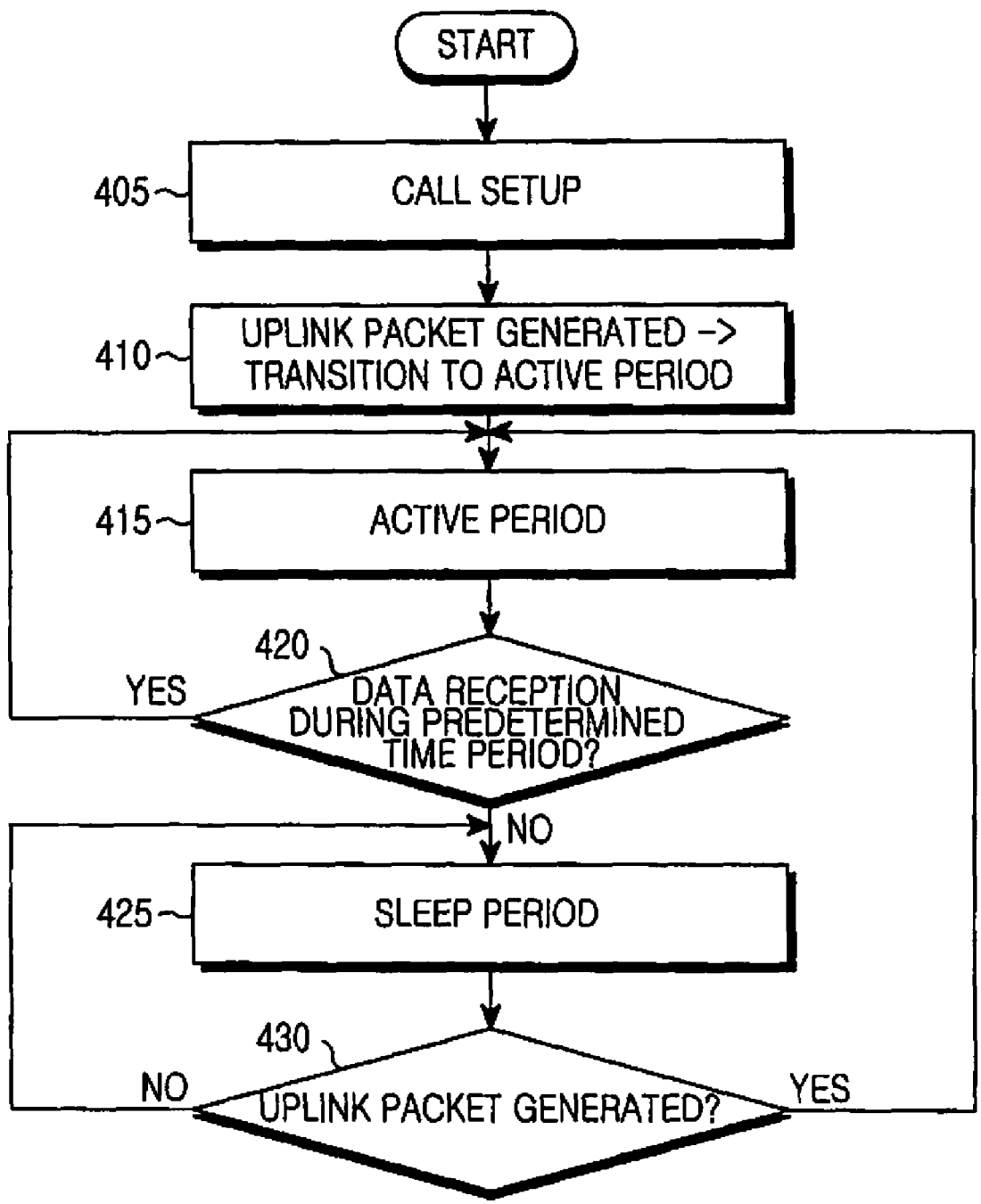
FIG. 4 is a flowchart illustrating the DRX operation according to the first exemplary embodiment of the present invention.

FIG. 4 is a flowchart illustrating the DRX operation according to the first exemplary embodiment of the present invention. Referring to FIG. 4, the UE sets up a call with the network, for a discontinuous data service such as a Web browsing service in step 405. As described above, the UE receives a minimum active period value A and a sleep period timer value B from the network during the call setup. In step 410, the UE operates in a sleep period until uplink data is generated, thus monitors if uplink packet data is generated during the sleep period.

Upon generation of uplink packet data for the call, the UE transitions from the sleep period to an active period and transmits the uplink packet data to the network in step 415. The UE can monitor reception of downlink data when the minimum active period A elapses in step 420. That is, in step 420, the UE determines if downlink packet data has been received during a time period corresponding to the sleep period timer value B after the minimum active period A elapses. If no downlink packet data is received during the time period, the UE transitions to a sleep period in step 425. However, if the UE receives downlink packet data during the time period corresponding to the sleep period timer value B, after the transmission of the uplink packet data, the UE maintains the sleep period in step 415.

During the sleep period, the UE monitors generation of uplink packet data in step 430. Upon generation of uplink packet data, the UE transitions to an active period in step 415. However, if no uplink packet data is generated in step 430, the UE maintains the sleep period.

Embodiment 2

In accordance with a second exemplary embodiment of the present invention, a DRX operation is performed in downloading and reading phases with different first and second DRX cycles. Because frequent data reception is expected in the downloading phase, the first DRX cycle of the downloading phase is set to be relatively short. However, data is not usually received and if ever, data reception is exceptional in the reading phase. Therefore, the second DRX cycle of the reading phase is set to be relatively long.

Figure 5:
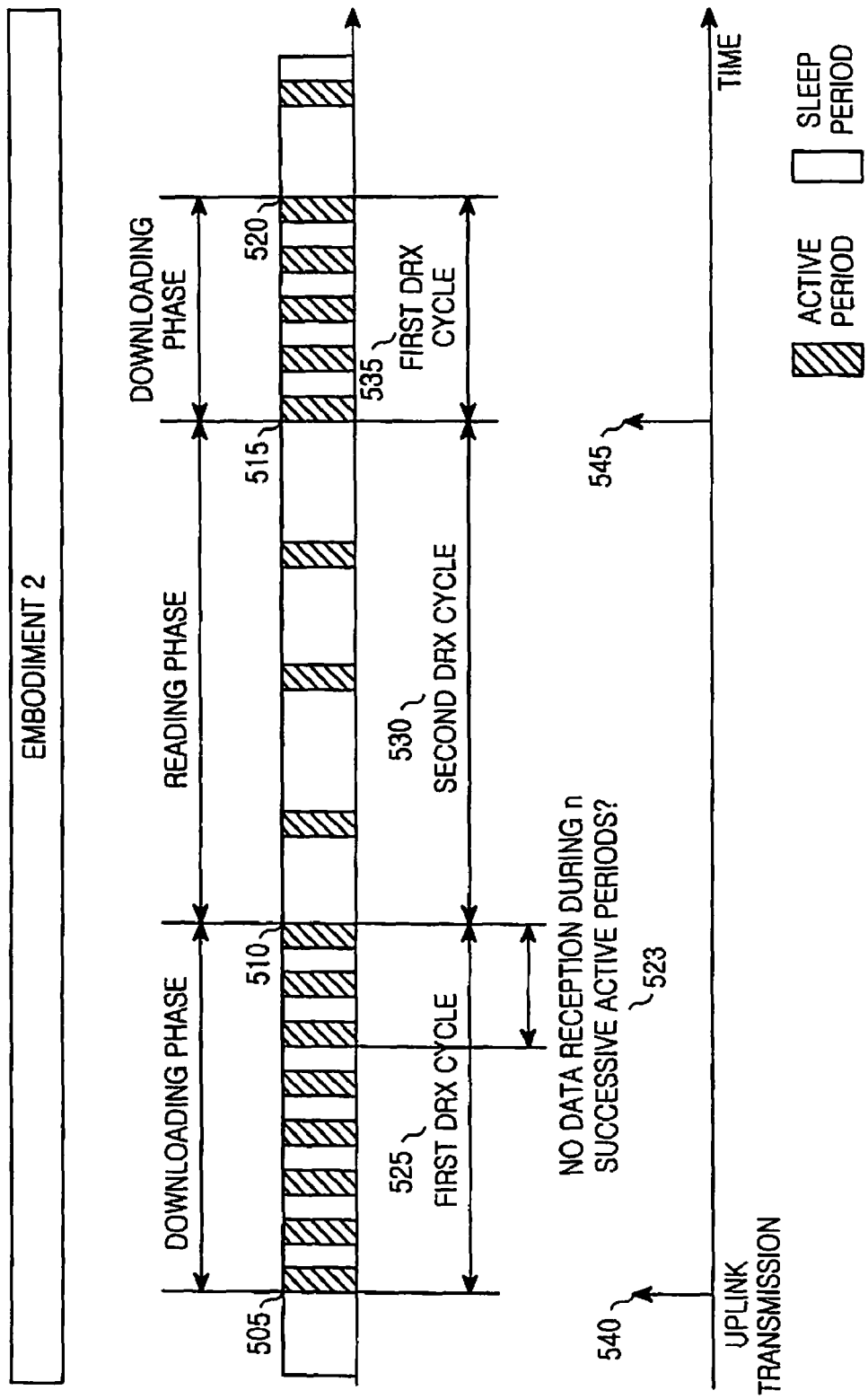
FIG. 5 conceptually illustrates a DRX operation according to a second exemplary embodiment of the present invention.

FIG. 5 conceptually illustrates a DRX operation according to the second exemplary embodiment of the present invention.

The UE receives predetermined setting information from the network during a call setup. The setting information includes a first DRX cycle length, a second DRX cycle length, and DRX transition conditions. The first DRX cycle length is the length of the first DRX cycle and the second DRX cycle length is the length of the second DRX cycle. When the call setup is completed, the UE transitions to a sleep period. FIG. 5 illustrates a situation after the UE starts to operate in the sleep period after the call setup.

The first and second DRX cycles apply to a downloading phase and a reading phase, respectively. Therefore, the first DRX cycle is shorter than the second DRX cycle.

The DRX transition conditions specify conditions for switching between the first and second DRX cycles. The DRX transition conditions are given as follows.

(1) Reading transition condition: a condition for transitioning from the downloading phase to the reading phase. If a UE does not receive downlink data during a predetermined number of (n) successive active periods in the downloading phase with the first DRX cycle, it transitions to the reading phase, concluding that there is no further downlink packet data to be received. Accordingly, the UE switches from the first DRX cycle to the second DR cycle.

(2) Downloading transition condition: a condition for switching from the second DRX cycle to the first DRX cycle. If the UE receives downlink data during a predetermined number of (m) successive active periods or uplink data corresponding to a specific logical channel (e.g., a Web browsing channel) in the reading phase with the second DRX cycle, it transitions to the downloading phase with the first DRX cycle, expecting reception of successive downlink packets.

Referring to FIG. 5, upon generation of first uplink packet data during a sleep period after the call setup with the network, the UE transmits the uplink packet data 540 to the network. Then the UE operates in a downloading phase with the first DRX cycle 525 as indicated by reference numeral 505. While it is described that the transmission of the uplink packet data precedes the start of the downloading phase, the opposite case is also possible.

If the UE receives downlink packet data during active periods of the first DRX cycle 525 in the downloading phase, it keeps the first DRX cycle 525. If the UE does not receive downlink packet data during n active periods in the downloading phase, as indicated by reference numeral 523, it ends the first DRX cycle 525 at 510. Because the UE expects no further reception of downlink packet data, it transitions to a reading phase with the second DRX cycle 530. The second DRX cycle 530 is longer than the first DRX cycle 525 and thus the UE sleeps longer in the reading phase.

In the reading phase with the second DRX cycle 530, the UE monitors generation of uplink packet data associated with the Web browsing service. Upon generation of uplink Web browsing packet data corresponding to a predetermined logical channel, the UE considers that the uplink Web browsing packet data is uplink data corresponding to the service that the UE has requested to the network. Then the UE transitions from the reading phase to the downloading phase. That is, upon generation of uplink packet data 545 in the reading phase with a second DRX cycle 530, the UE transmits the uplink packet data to the network and ends the reading phase in step 515. The UE transitions to the downloading phase and operates according to the first DRX cycle as indicated by reference numeral 535, until the downloading phase ends at 520.

The transition between the downloading and reading phases with different DRX cycles continues until the call corresponding to the UE-requested service is terminated.

In accordance with the second exemplary embodiment of the present invention described above, when the UE transmits uplink data corresponding to a predetermined logical channel, it ends a reading phase with a long DRX cycle (i.e., the second DRX cycle length) and starts a downloading phase with a short DRX cycle (i.e., the first DRX cycle length).

Figure 6:
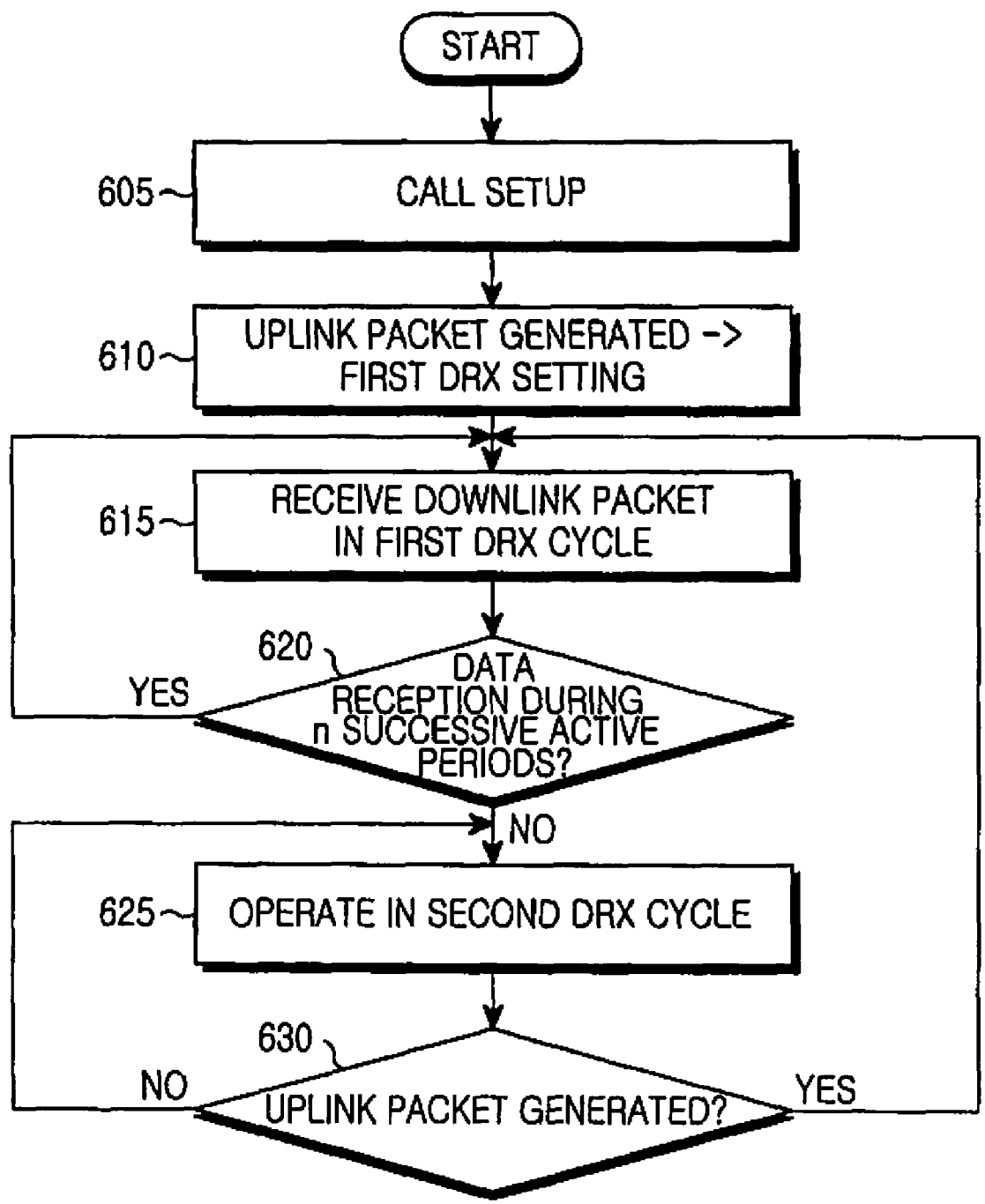
FIG. 6 is a flowchart illustrating the DRX operation according to the second exemplary embodiment of the present invention.

FIG. 6 is a flowchart illustrating the DRX operation according to the second exemplary embodiment of the present invention. Referring to FIG. 6, the UE sets up a call with the network, for a discontinuous data service, such as a Web browsing service, and receives predetermined setting information (i.e., first and second DRX cycle lengths) from the network in step 605. The UE may further receive information about DRX transition conditions (e.g., a downloading transition condition and a reading transition condition). The first and second DRX cycle lengths and the DRX transition conditions have been described in detail with reference to FIG. 5 and thus will not be redundantly described herein below.

The UE awaits generation of uplink data for the call. Upon generation of uplink data, the UE transmits the uplink data and starts to operate in a downloading phase with a first DRX cycle having the first DRX cycle length in step 610. The generation of the uplink data during the call means that uplink data has been generated on a logical channel corresponding to the call.

In step 615, the UE receives downlink packets in the downloading phase with the first DRX cycle. The UE monitors if downlink data has not been received during n active periods according to the reading transition condition in step 620.

If no downlink data has been received during the n active periods, the UE discontinues the downloading phase and transitions to a reading phase with a second DRX cycle having the second DRX cycle length in step 625. However, if the UE has received downlink packet data during m active periods in the reading phase with the second DRX cycle, it transitions to a downloading phase with the first DRX cycle in step 615.

The UE monitors generation of uplink data corresponding to a predetermined logical channel ID associated with the call in step 630. Upon generation of the uplink data, the UE transitions to a downloading phase with the first DRX cycle in step 615. In the absence of the uplink data, however, the UE maintains the reading phase with the second DRX cycle, in which it sleeps relatively long.

Embodiment 3

The second exemplary embodiment of the present invention applies to a specific logical channel (e.g., a Web browsing service channel). In a normal service other than the Web browsing service, there is also a high probability that uplink data transmission is followed by downlink data transmission in a near future. For example, if Automatic Repeat reQuest (ARQ) is activated on a radio channel, uplink data transmission causes reception of an ACK signal for the data at a near time instant, and control signal transmission is followed by reception of a response control signal. Therefore, the present invention is also applicable to normal service channels.

In accordance with a third exemplary embodiment of the present invention, a DRX operation is performed by computing the start positions of active periods in the downloading and reading phases. For ease of description, the start position of an active period during the DRX operation is referred to as an active period starting position.

The active period starting position is calculated by Equation (1):

$$\text{active period start position} = \text{MOD}\,[[\text{initial start position} + k \times DRX \text{ cycle length}], [\text{maximum system frame number} + 1]] \quad (1)$$

where k is an integer equal to or larger than 0.

In equation (1), a system frame number is the count of frames, each frame being a time unit of a radio channel. The system frame number increases by 1 each time one frame is passed.

In general, a frame length and a maximum system frame number are defined independently in each mobile communication system. For example, the frame length is 10 msec and a system frame number ranges from 0 to 4095 in Universal Mobile Telecommunication System (UMTS). A future-generation mobile communication system such as Long Term Evolution (LTE) is expected to use almost the same values. Therefore, the third exemplary embodiment of the present invention will be described in the context of those values.

The modulo operation (MOD) described in Equation (1) is performed in order to express the active period start position as a value below the maximum system frame number.

The initial start position of Equation (1) is calculated by substituting a parameter known to a UE and a Node B into a known formula. The initial start position can be given by Equation 2.

$$\text{initial start position}=\text{MOD [UE ID, DRX cycle length]} \quad (2)$$

The active period start position computation by Equation (1) and Equation (2) will be described using the following example.

If the UE ID is 100 and the DRX cycle length is 1000, the initial start position is 100 (=MOD [100, 1000]) according to Equation (2) and the active period start positions for the UE are 100, 2100, 4, 2004 (=MOD [[100+k×000], 4096]) according to Equation (1).

Notably, in the above example, the active period start positions may vary with the DRX cycle length. If the DRX cycle length is changed from 1000 to 4000 under the same condition, the active period start positions are computed by:

$$\text{Active period start position}=\text{MOD [[100+}k\text{×4000]}, 4096]=100, 4, 4004, 3908, 3912, \ldots$$

Figure 7:
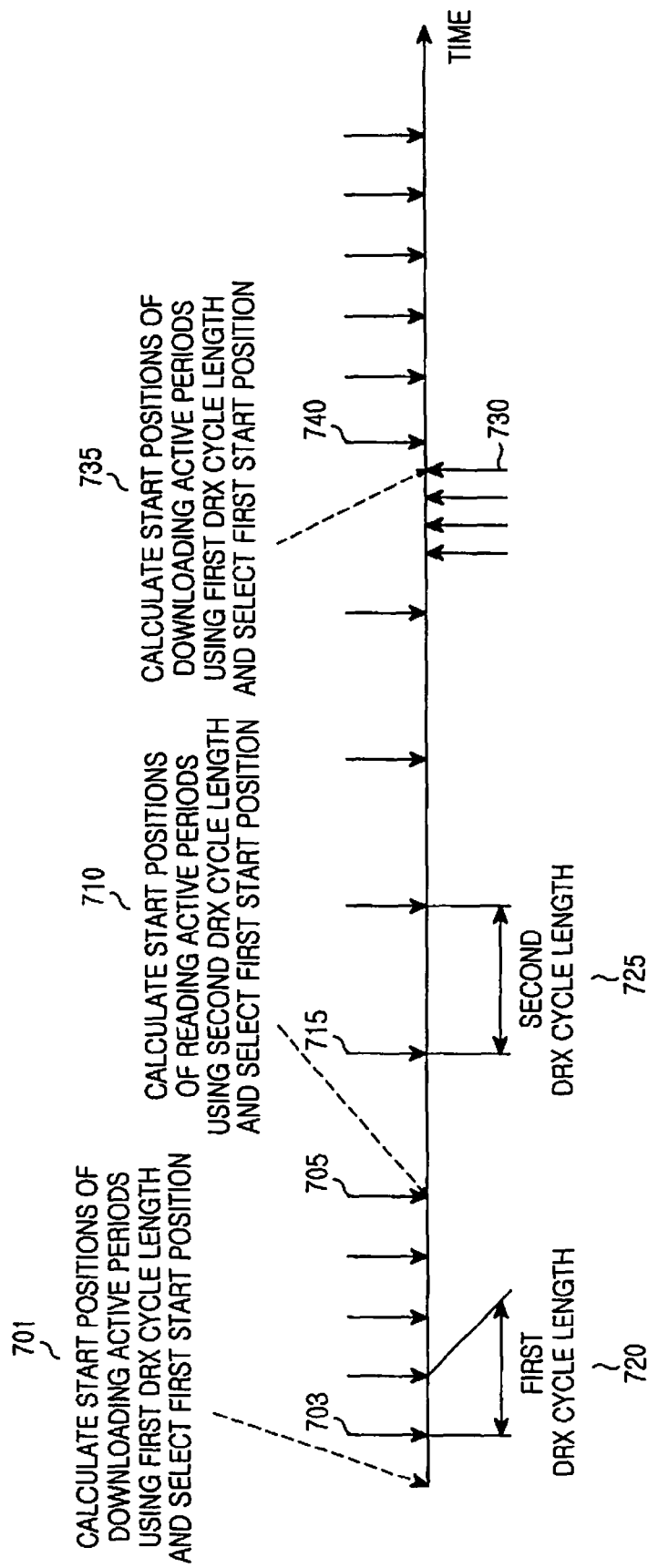
FIG. 7 conceptually illustrates a DRX operation according to a third exemplary embodiment of the present invention.

FIG. 7 conceptually illustrates a DRX operation according to the third exemplary embodiment of the present invention.

During a call setup with the network, the UE receives predetermined setting information from the network as in the second exemplary embodiment of the present invention. The setting information includes first and second DRX cycle lengths and DRX transition conditions (i.e., a downloading transition condition and a reading transition condition). The first and second DRX cycle lengths are the lengths of first and second DRX cycles, respectively.

As the first and second DRX cycles have been described in detail for the second exemplary embodiment of the present invention, they will not be described herein again. Notably, the UE can calculate active period start positions using the first and second DRX cycle lengths in the third exemplary embodiment of the present invention.

The reading transition condition and the downloading transition condition can be given as follows.

(1) Reading transition condition: a condition for transitioning from the downloading phase to the reading phase. If a UE does not receive downlink data during a predetermined number of (n) successive active periods in the downloading phase with the first DRX cycle, it transitions to the reading phase, as in the second exemplary embodiment of the present invention.

(2) Downloading transition condition: a condition for transitioning from the second DRX cycle to the first DRX cycle. If the UE receives downlink data during a predetermined number of (m) successive active periods or transmits uplink data for a service channel in the reading phase, it transitions to the downloading phase. Compared to the second exemplary embodiment of the present invention, generation of uplink data for any service channel fulfils the downloading transition condition.

Referring to FIG. 7, when the call setup is completed, the UE calculates first active period start positions using the first DRX cycle length in step 701. The UE selects a first active period start position to come nearest to a current time from among the first active period start positions as the start position 703 of a downloading phase. The UE monitors the presence or absence of scheduled data for the UE using control information received on a control channel from the Node B. In the absence of scheduled data, the UE sleeps until the start position of the next active period in the downloading phase.

Then the UE operates in the first DRX cycle from the start position of an active period 703. If the UE then has not received downlink packet data during n successive active periods (n=4 herein) corresponding to a first DRX cycle length 720, it determines that the reading transition condition is fulfilled. Therefore, the UE calculates second active period start positions using Equation (1) at the end 705 of an $n^{th}$ active period in step 710. The UE selects a second active period start position 715 to come nearest to a current time from among the second active period start positions as the start position of a reading phase. Thereafter, the UE operates in the reading phase by applying the second DRX cycle according to a second DRX cycle length 725, starting from the start position of the reading phase.

Upon generation of uplink data for a channel in the reading phase with the second DRX cycle, the UE transmits the uplink packet data. That is, the UE notifies the scheduler of the presence of uplink transmission data and transmits the uplink packet data in allocated uplink transmission resources. At the end 730 of the uplink data transmission, the UE calculates third active period start positions by substituting the first DRX cycle length into Equation (1) in step 735. The UE selects a third active period start position 740 to come nearest to a current time from among the third active period start positions as the start position of a downloading phase and starts to download data. As described above, the uplink data can be transmitted after transitioning to the downloading phase.

Figure 8:
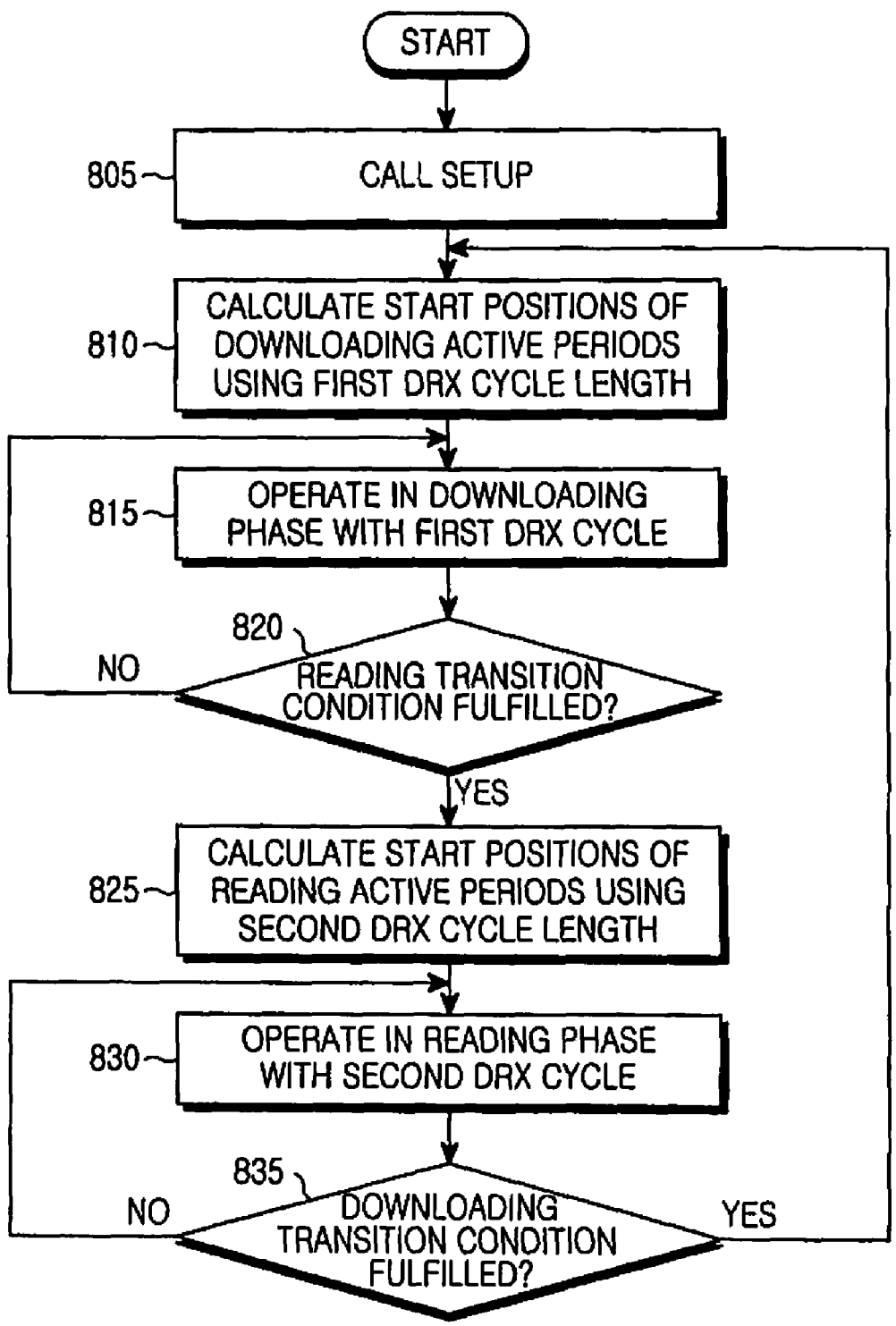
FIG. 8 is a flowchart illustrating the DRX operation according to the third exemplary embodiment of the present invention.

FIG. 8 is a flowchart illustrating the DRX operation according to the third exemplary embodiment of the present invention. Referring to FIG. 8, the UE receives predetermined setting information from the network during a call setup in step 805. The setting information includes first and second DRX cycle lengths and DRX transition conditions (e.g. a downloading transition condition and a reading transition condition). The first and second DRX cycle lengths are the lengths of first and second DRX cycles, respectively.

In step 810, the UE calculates first active period start positions (i.e. downloading active period start positions) using the first DRX cycle length and a predetermined parameter such as a UE ID by Equation (1).

In step 815, the UE selects a first active period start position to come nearest to a current time from the first active period start positions as the start position of a downloading active period and starts to operate in a downloading phase. That is, the UE sleeps until the start position of the downloading active period and monitors a control channel according to the first DRX cycle, starting from the start position of the downloading active period. If the UE has not received downlink packet data for a predetermined time period on the control channel, it transitions to a sleep period and sleeps until the start position of the next downloading active period.

In step 820, the UE monitors if the reading transition condition has been fulfilled during the operation in the downloading phase. If the reading transition condition is fulfilled, for example, if the UE has not received downlink packet data during n successive downloading active periods in the downloading phase with the first DRX cycle, it calculates second active period start positions (i.e., reading active period start positions) using the second DRX cycle length in step 825. Then the UE operates in the reading phase with the second DRX cycle in step 830. However, if the reading transition condition is not fulfilled in step 820, the UE operates in the downloading phase in step 815.

In step 830, the UE operates in the reading phase with the second DRX cycle. During the operation in the reading phase, the UE monitors if the downloading transition condition has been fulfilled, that is, if uplink data is generated or downlink data has been received during m successive active periods in step 835. If the downloading transition condition has been fulfilled, the process returns to step 810, where the UE calculates first active period start positions by Equation (1) and operates in the downloading phase. If the downloading transition condition has not been fulfilled, in step 830, the UE continues operate in the reading phase.

In accordance with the third exemplary embodiment of the present invention, the UE calculates active period start positions using a new DRX cycle length every time a DRX cycle length is changed. Accordingly, the same active period start positions are known to the UE and the Node B.

Figure 9:
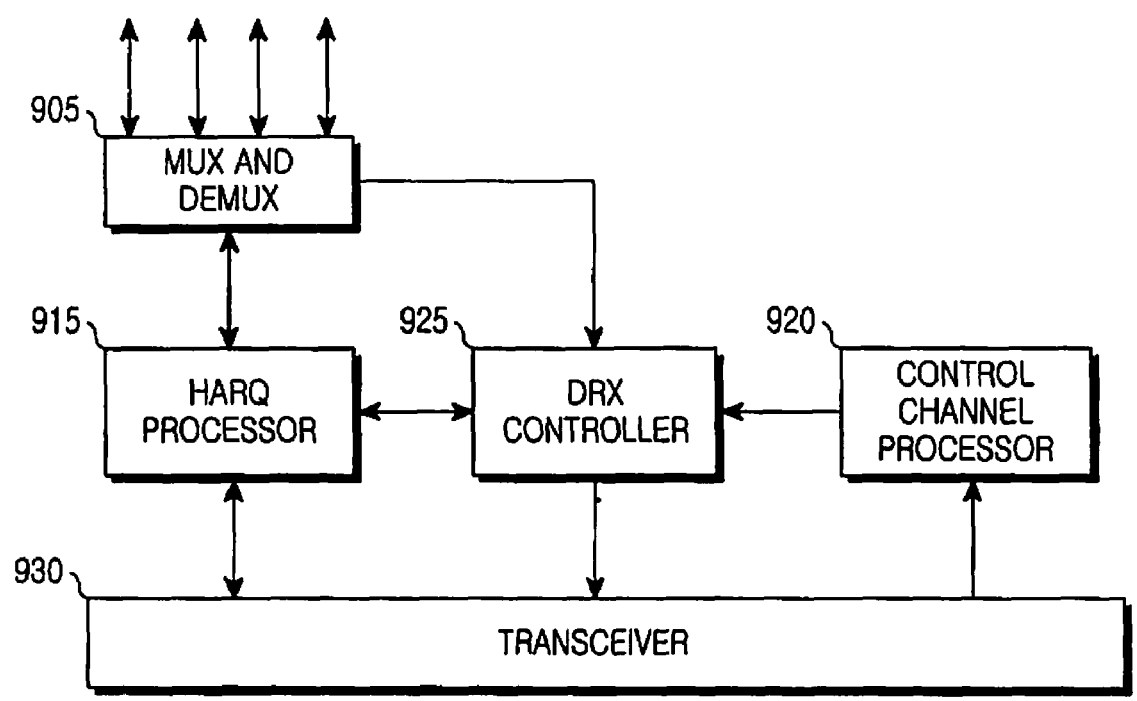
FIG. 9 is a block diagram of the UE according to an embodiment of the present invention.

FIG. 9 is a block diagram of a UE according to an exemplary embodiment of the present invention. Referring to FIG. 9, the UE includes a Multiplexer (MUX) and a Demultiplexer (DEMUX) 905, a Hybrid Automatic Repeat reQuest (HARQ) processor 915, a transceiver 930, a DRX controller 925, and a control channel processor 920. The transceiver 930 is turned on or off under the control of the DRX controller 925. The DRX controller 925 turns off the transceiver 930 during a sleep period and turns it on during an active period.

The HARQ processor 915 performs an HARQ operation. The HARQ processor 915 detects errors in packets received through the transceiver 930. The HARQ processor 915 requests retransmission of an erroneous packet to a transmitter and soft-combines the previous packet with a retransmitted packet, thereby ensuring reception performance. The HARQ processor 915 processes an HARQ packet and provides a normal HARQ packet to the MUX and DEMUX 905.

The MUX and DEMUX 905 demultiplexes the HARQ packet and provides the demultiplexed packets to an upper layer. The MUX and DEMUX 905 multiplexes packets received from the upper layer to one HARQ packet and transmits the uplink packet data generated from the upper layer to a network node through the transceiver 930. Additionally, the MUX and DEMUX 905 transmits a Web browsing service request message according to the present invention.

The control channel processor 920 provides control signals received from the network through the transceiver 930 to the DRX controller 925.

In accordance with the first exemplary embodiment of the present invention, the DRX controller 925 determines whether to transmit uplink packet data and whether to receive downlink packet data. If the UE receives a download service, the DRX controller 925 determines whether the UE is in an active period or a sleep period in a DRX operation.

If uplink packet data is transmitted, the UE transitions to an active period. If the UE does not receive downlink packet data during a time period corresponding to a sleep period timer value B received from the network node during the active period, it transitions to the sleep period. If a plurality of DRX operations are ongoing for a plurality of services, the DRX controller 925 turns on or off the transceiver 930, taking into account the DRX statuses of the services.

In accordance with the second exemplary embodiment of the present invention, the transceiver 930 can receive setting information including first and second DRX cycle lengths and DRX transition conditions from the network and provide the setting information to the control channel processor 920. The control channel processor 920 provides the received setting information to the DRX controller 925. When needed, the UE and the Node B may preset the information without the UE receiving the setting information. The DRX controller 925 controls DRX setting according to the DRX transition conditions. That is, the DRX controller 925 sets a DRX cycle by determining if a transition condition has been fulfilled by monitoring generation of uplink packet data and the presence or absence of downlink packet data to be received. That is, if uplink packet data is transmitted, which implies that downlink data will be received soon, the DRX controller 925 transitions the UE to a downloading phase using a first DRX cycle, which is relatively short (the first DRX cycle length). If the UE does not receive downlink packet data during n successive active periods (n is indicated by the network), the DRX controller 925 applies a second DRX cycle, which is relatively long (the second DRX cycle length).

If a plurality of DRX operations are on going for a plurality of services, the DRX controller 925 turns on or off the transceiver 930, taking into account the DRX statuses of the services.

In accordance with the third exemplary embodiment of the present invention, the DRX controller 925 calculates active period start positions using two different DRX cycle lengths (i.e., the first and second DRX cycle lengths) that are predetermined or received from the Node B through the transceiver 930. Upon generation of uplink data or when a call setup is completed, the DRX controller 925 calculates first active period start positions using Equation (1) and Equation (2) with the first DRX cycle length that is relatively short. When downlink data is not received during a predetermined number of (n) active periods in the downloading phase using a first DRX cycle having the first DRX cycle length, the DRX controller 925 calculates second active period start positions using Equation (1) and Equation (2) with the second DRX cycle length that is relatively long.

The transceiver 930 performs a DRX operation, starting from a first or second active period start position to come nearest to a current time among the first or second active period start positions under the control of the DRX controller 925.

As is apparent from the above description, the present invention enables a UE to transition between a sleep period and an active period variably according to data generation. The resulting different lengths of the active and sleep periods according to a data generation situation leads to a more flexible DRX operation. Therefore, the power consumption of a connected-state UE is minimized.

While the present invention has been shown and described with reference to certain embodiments of the present invention thereof, it will be understood by those skilled in the art that various changes in form and details may be made therein without departing from the spirit and scope of the present invention as defined by the appended claims and their equivalents.

What is claimed is:

1. A method of Discontinuous reception (DRX) for a User Equipment (UE) in a mobile communication system, comprising:
    performing DRX using a first DRX cycle length when a new transmission of data occurs at the UE; and
    performing DRX using a second DRX cycle length when either a new transmission or a reception of data does not occur at the UE for a predetermined time during the DRX using the first DRX cycle length.

2. The DRX method of claim 1, wherein the first DRX cycle length is shorter than the second DRX cycle length.

3. The DRX method of claim 1, wherein a start point of the first DRX cycle is determined based on at least one of a parameter indicating the start point, the first DRX cycle length and a system frame number.

4. An apparatus of Discontinuous reception (DRX) for a User Equipment (UE) in a mobile communication system, comprising:
   a DRX controller for performing DRX using a first DRX cycle length when a new transmission of data occurs at the UE, and performing DRX using a second DRX cycle length when either a new transmission or reception of data does not occur at the UE for a predetermined time during the DRX using the first DRX cycle length.

5. The DRX apparatus of claim 4, wherein the first DRX cycle length is shorter than the second DRX cycle length.

6. The DRX apparatus of claim 4, wherein a start point of the first DRX cycle is determined based on at least one of a parameter indicating the start point, the first DRX cycle length and a system frame number.

* * * * *